United States Patent
Detlefs et al.

(10) Patent No.: US 7,765,555 B2
(45) Date of Patent: Jul. 27, 2010

(54) FACILITATING BULK LOCK-UNBIASING IN AN OBJECT-BASED SYSTEM

(75) Inventors: David L. Detlefs, Westford, MA (US); Kenneth B. Russell, Sunnyvale, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1200 days.

(21) Appl. No.: 11/353,537

(22) Filed: Feb. 14, 2006

(65) Prior Publication Data
US 2006/0288351 A1 Dec. 21, 2006

Related U.S. Application Data

(63) Continuation-in-part of application No. 11/156,308, filed on Jun. 17, 2005, now Pat. No. 7,519,967.

(60) Provisional application No. 60/763,078, filed on Jan. 27, 2006.

(51) Int. Cl.
G06F 9/44 (2006.01)
G06F 12/00 (2006.01)
G06F 9/46 (2006.01)

(52) U.S. Cl. .......... 719/316; 718/107; 710/200
(58) Field of Classification Search ......... 719/310, 719/316; 718/102, 104, 107; 710/200
See application file for complete search history.

(56) References Cited

U.S. PATENT DOCUMENTS

| | | | |
|---|---|---|---|
| 5,862,376 A * | 1/1999 | Steele et al. | 718/107 |
| 5,872,981 A * | 2/1999 | Waddington et al. | 710/200 |
| 6,339,782 B1 * | 1/2002 | Gerard et al. | 718/1 |
| 6,349,322 B1 * | 2/2002 | Shaylor | 718/107 |
| 6,411,983 B1 * | 6/2002 | Gallop | 718/104 |
| 6,487,652 B1 * | 11/2002 | Gomes et al. | 712/23 |
| 6,510,437 B1 * | 1/2003 | Bak et al. | 718/100 |
| 6,523,059 B1 * | 2/2003 | Schmidt | 718/100 |
| 6,735,760 B1 * | 5/2004 | Dice | 717/139 |
| 6,772,153 B1 * | 8/2004 | Bacon et al. | 707/8 |
| 6,799,236 B1 * | 9/2004 | Dice et al. | 710/200 |
| 7,209,918 B2 * | 4/2007 | Li | 707/8 |
| 7,444,634 B2 * | 10/2008 | Jeyaram | 718/104 |
| 7,567,963 B2 * | 7/2009 | Shpeisman et al. | 1/1 |
| 7,610,585 B2 * | 10/2009 | Shpeisman et al. | 718/102 |
| 7,644,409 B2 * | 1/2010 | Dice et al. | 718/104 |
| 2001/0014905 A1 * | 8/2001 | Onodera | 709/102 |

(Continued)

*Primary Examiner*—Van H Nguyen
(74) *Attorney, Agent, or Firm*—Park, Vaughan & Fleming LLP; Mark Spiller (57) ABSTRACT

One embodiment of the present invention provides a system that facilitates bulk lock-unbiasing for objects within an object-based computing system. The system maintains an epoch, which is a field containing a timestamp, for a biasable object class and each instance of the biasable object class. If the epoch for the biasable object class matches the epoch for a specific instance of the biasable object class, the system knows that any bias for that specific instance is currently valid. When the system receives a signal to perform a bulk lock-unbiasing operation for instances of the biasable object class, it responds by stopping all threads in the object-based computing system at a safe point. Then, the system performs a bulk lock-unbiasing operation for unlocked instances of the biasable object class by incrementing the epoch for the biasable object class and by incrementing corresponding epochs for locked instances of the biasable object class.

20 Claims, 4 Drawing Sheets

U.S. PATENT DOCUMENTS

2005/0289549 A1* 12/2005 Cierniak et al. ............. 718/102
2006/0031844 A1* 2/2006 Dice et al. ................. 718/106
2006/0090168 A1* 4/2006 Ogasawara et al. ......... 719/320
2008/0072238 A1* 3/2008 Monnie et al. ............. 719/310

* cited by examiner

FIG. 1
(PRIOR ART)

X00 → LOCKED
001 → UNLOCKED
101 → BIASABLE
X10 → INFLATED
X11 → MARKED

FACILITATING BULK LOCK-UNBIASING IN AN OBJECT-BASED SYSTEM

RELATED APPLICATIONS

This application is a continuation-in-part of U.S. patent application Ser. No. 11/156,308 filed on 17 Jun. 2005 by inventor Kenneth B. Russell, entitled "Facilitating Biased Synchronization in an Object-Based System" (now U.S. Pat. No. 7,519,967). This application hereby claims priority under 35 U.S.C. §120 to the above-listed parent patent application. This application also claims priority under 35 U.S.C. §119(e) to U.S. Provisional Application Ser. No. 60/763,078, filed on 27 Jan. 2006, the contents of which are herein incorporated by reference.

BACKGROUND

1. Field of the Invention

The present invention relates to object-based computing systems. More specifically, the present invention relates to a method and an apparatus that facilitates bulk lock-unbiasing for objects within an object-based computing system.

2. Related Art

Object-based computer programs differ from typical function-based computer programs because each element of computation in an object-based computer program is associated with an "object." Furthermore, the structure of each object is defined by an associated data type called a "class."

Figure 1:
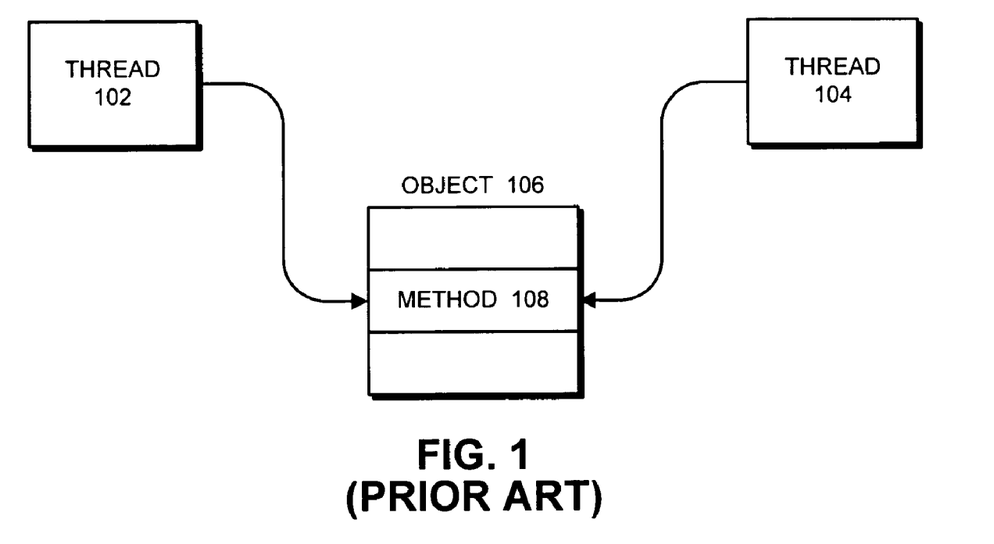
FIG. 1 illustrates two threads attempting to execute the same method in an object instance.

Many object-based computer systems support "multi-threading." In such multi-threaded systems, multiple threads of execution may attempt to access the same object simultaneously, which can lead to contention problems. For example, FIG. 1 illustrates how a thread 102 and a thread 104 attempt to execute the same method 108 within object instance 106.

To correctly arbitrate between these concurrent executions, the object is typically associated with a mutual-exclusion primitive, such as a mutex or monitor. There is a large body of literature describing various techniques and paradigms for implementing these mutual-exclusion primitives.

Processors that support multi-threading typically provide "atomic operations," which can be used to implement mutual-exclusion primitives. These atomic operations are guaranteed to execute without interference from concurrently executing threads, and without interference from threads on other processors. Because of the complexity involved in ensuring that atomic operations execute without interference from other threads, atomic operations are considerably more time-consuming to execute than ordinary operations, such as additions and subtractions.

A thread can use mutual-exclusion primitives to "lock" specific objects to reduce interference, but this uses numerous atomic operations. To reduce locking overhead, a system can allow objects to be "biased" towards specific threads, thereby allowing threads to access biased objects as if they were locked, but without atomic operations. However, this capability can lead to situations in which a large number of biased objects need to be unbiased, in which case the system often has to search the entire object heap to find and unbias the desired objects. This bulk-unbiasing operation can be very computationally expensive, and does not scale well for processes with large object heaps.

Hence, what is needed is a method and an apparatus for facilitating bulk lock-unbiasing without the limitations of the above-described techniques.

SUMMARY

One embodiment of the present invention provides a system that facilitates bulk lock-unbiasing for objects within an object-based computing system. The system maintains an epoch, which is a field containing a timestamp, for a biasable object class and each instance of the biasable object class. If the epoch for the biasable object class matches the epoch for a specific instance of the biasable object class, the system knows that any bias for that specific instance is currently valid. When the system receives a signal to perform a bulk lock-unbiasing operation for instances of the biasable object class, it responds by stopping all threads in the object-based computing system at a safe point. Then, the system performs a bulk lock-unbiasing operation for unlocked instances of the biasable object class by incrementing the epoch for the biasable object class and by incrementing corresponding epochs for locked instances of the biasable object class.

In a variation on this embodiment, when incrementing the epoch for locked instances the system searches the stack of a thread to identify instances of the biasable object class which are locked by the thread. The system then updates the epochs for the identified locked instances by incrementing the epoch values associated with the instances.

In a variation on this embodiment, the system maintains the epoch for the biasable object class by storing the epoch in a prototype header located in the metadata of the biasable object class.

In a further variation, the system encounters a lock-acquisition operation while executing a current thread, wherein the lock-acquisition operation attempts to acquire a lock for a specific instance. In response to the lock-acquisition operation, the system examines synchronization information associated with the specific instance, wherein the process of examining the synchronization information does not involve atomic operations. If the synchronization information indicates that: (1) the lock is biasable, (2) the lock is biased toward the current thread, and (3) the epoch of the specific instance matches the epoch of the biasable object class, the system allows the current thread to acquire the lock without updating the synchronization information.

In a further variation, if the synchronization information indicates that the lock is biasable and the lock is presently unbiased, or that the lock is biasable but the epoch of the specific instance does not match the epoch of the biasable object class, the system uses an atomic operation to attempt to update the synchronization information to indicate that the lock is biased toward the current thread in the current epoch of the biasable object class. If this atomic operation succeeds, the system allows the current thread to acquire the lock.

In a further variation, if the synchronization information indicates that the lock is biasable, the lock is biased toward another thread, and the epoch of the specific instance matches the epoch of the biasable object class, the system revokes the bias of the lock.

In a further variation, if the atomic operation fails, the bias of the lock is revoked, or the synchronization information indicates that the lock is not biasable, the system falls back to an underlying synchronization technique to acquire the lock.

In a variation on this embodiment, the system estimates a rate of bias revocation on a per-data-type basis. If the estimated rate of bias revocation for a given data type exceeds a threshold value, the system performs either a bulk unbias or a bulk revocation for all instances of the given data type.

In a further variation, the system uses the prototype header to construct a value to be compared with synchronization information associated with the specified instance using a single XOR operation.

In a further variation, the synchronization information associated with the object is contained within a synchronization word within the object.

Table 1 illustrates pseudocode for locking biasable objects with epochs in accordance with an embodiment of the present invention.

Table 2 illustrates pseudocode for locking biasable objects with epochs but without biasable bits in accordance with an embodiment of the present invention.

Table 3 illustrates pseudocode for locking biasable objects with epochs and biasable bits in accordance with an embodiment of the present invention.

Table 4 illustrates pseudocode for locking biasable objects with aligned epochs and biasable bits in accordance with an embodiment of the present invention.

Table 5 illustrates pseudocode for locking biasable objects with epochs dependent on an allocation site in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices, such as disk drives, magnetic tape, CDs (compact discs) and DVDs (digital versatile discs or digital video discs).

Overview

The Java™ programming language makes multithreaded programming easily accessible. This ease also has its drawbacks, since multithreaded programming is notably difficult. In an attempt to enhance safety as much as possible, many of the commonly-used data structures in the Java™ libraries use the "synchronized" construct to ensure mutually exclusive access to the data structures by multiple threads.

However, many times uses of such data structures are not in fact multithreaded, e.g. a given data structure is accessed only by a single thread. Sometimes this property can be proved by static analysis, allowing the locking to be eliminated, but reasonably often there are cases where the property is true, but cannot be easily proved by reasonable static analysis techniques, or else is not true, but is overwhelmingly often true in execution.

To handle such cases, many systems use "biased locking" schemes. For instance, in Java™, all objects are lockable, as if they each contain embedded lock objects. Normally, an object is either locked or unlocked. The locked state names the locking thread, and, in addition, since Java™ admits recursive locking, may also include a lock count associated with the locked state. Threads executing a lock operation block until the object is in the unlocked state, after which exactly one thread succeeds in becoming the new lock owner. Generally, ensuring this mutual exclusion property needs some sort of expensive atomic hardware operation.

Biased locking schemes seek to avoid atomic hardware operations. In addition to the states described above, a biased locking scheme adds a biased state which also names a thread, the bias owner. A biased object is considered to be locked by the bias owner, and a following lock operation performed by the bias owner only needs to confirm that the current thread is the bias owner. In contrast to the ordinary locking protocol, an unlock operation (specifically, a non-recursive unlock that reduces the lock count to zero) performed by the bias owner does not return the object to the unlocked state. Instead, the operation leaves the object in the biased state. Leaving the object in the biased state makes locking very cheap for the bias owner, while even a currently-unlocked biased object is effectively locked by the bias owner from the viewpoint of other threads.

There are various techniques for setting an object's bias owner initially. One technique makes the thread that allocates the object the bias owner. Another technique adds a "biasable" attribute to an object. A thread attempting to acquire a lock on a biasable, unlocked object attempts to also acquire the object's bias (using atomic instructions to serialize concurrency between multiple threads). Threads lock unbiasable objects in the traditional atomic way.

Since a system using biased locking may not be able to prove that an object is locked only by a single thread, and situations may result where this may not be true, the system needs to handle situations in which a thread other than the bias owner attempts to acquired a lock on a biased object. Biased locking schemes provide a mechanism for "bias revocation," in which the system removes the bias of an object so that threads other than the bias holder may also acquire the lock.

Bias revocation generally involves some way of halting the bias-owner thread at a safe program point, determining whether it currently holds a lock on an object (via a "currently-locked" bit, or by scanning the thread's stack), and then, depending on the outcome of this query, either resetting the object to the unlocked state or making the thread appear to have locked the object in the ordinary unbiased way.

Unbiasing multiple individual objects can be expensive. In a system containing a heap with millions of objects biased towards one thread, a program phase change might cause another thread to operate upon the objects. In this situation, the system might use heuristics to detect frequent individual-object unbiasing, and invoke a bulk-unbiasing technique. Such a bulk-unbiasing operation might either unbias all objects in the heap, or perhaps detect that objects of a type T are being frequently unbiased, and therefore unbias all objects of type T.

One technique to accomplish such a bulk-unbias operation is to traverse all heap objects and unbias either all objects or all objects of type T, respectively. To do so, the system typically first halts all program threads in order to accurately determine whether a biased object is currently locked and thereby determine how to properly unbias the object. Traversing all heap objects (with mutator threads halted) is expensive for programs with large heaps, and potentially far outweighs the benefits of biased locking. The present invention describes a method of performing bulk unbiasing without heap traversal.

Process of Acquiring a Lock

In one embodiment of the present invention, when an object is newly allocated, a "bias indicator" (such as a bias bit) is set in a synchronization word in the object to indicate that the object is capable of being biased toward a thread. For example, the "mark word" in an object's header (which is typically used to store state information for garbage-collection purposes) can also be used to store state information related to locking.

Figure 2:
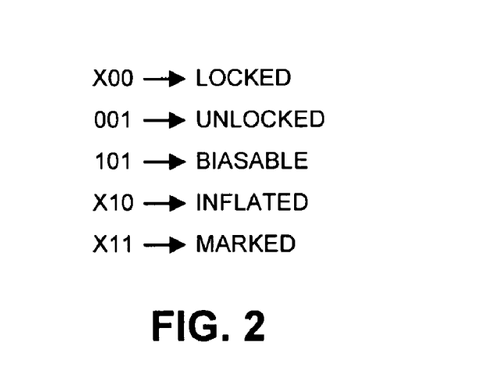
FIG. 2 illustrates exemplary bit patterns that indicate whether an object is biasable and/or locked in accordance with an embodiment of the present invention.

Referring to FIG. 2, in one embodiment of the present invention, the three least-significant bits of the mark word for an object are used to indicate whether the object is locked and/or biasable. If the three least significant bits are 101, the object is biasable. Otherwise, the object is not biasable, and the lock state of the object is governed by the underlying synchronization technique. In this technique, if the three least-significant bits are 001, the object is unlocked. If the three least-significant bits are X00 (where X is a don't care), the object is "lightweight locked". If the three least-significant bits are X10, the object is "inflated", i.e. that it is associated with a heavyweight locking primitive. Finally, if the three least-significant bits are X11, the object is marked for garbage-collection purposes.

One embodiment of the present invention uses appropriate memory alignment of thread identifiers in the application to ensure the so-called "bias bit", and optionally the age bits, will never be used in the binary representation of the thread identifier. This potentially consumes additional memory because the thread identifier may have to be relocated in memory. However, the requirement eliminates the need for an extra word in the object and allows the technique to be used with all data types in the system rather than a select few.

Figure 3A:
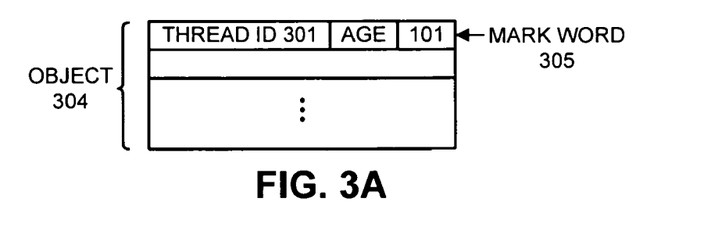
FIG. 3A illustrates the state of an object after the object has been biased by a given thread in accordance with an embodiment of the present invention.

In one embodiment of the present invention, instead of highly-aligning the thread objects to represent their pointers compactly, the system instead gives each thread a small, dense integer thread ID. The system maintains a table mapping these indices to full-scale (normally-aligned) thread pointers. Note that this embodiment could provide more space in the mark word 305 for additional fields.

The first thread which acquires the lock examines the mark word to determine whether the lock is biasable. If so, the thread uses an atomic operation to attempt to place its thread identifier into the synchronization word, wherein the thread identifier is masked with appropriate bits to indicate that the contents of the synchronization word represent a lock biased toward that thread. For example, in FIG. 3A an object 304 contains a mark word 305 in its header. The three least significant bits of mark word 305 are set to 101 to indicate that the object is biasable. The high bits are set to contain the thread identifier 301. Note that other bits of mark word 305 may contain other information, such as the generational garbage collection age for the object.

Subsequent acquisitions of the lock by the thread toward which the lock is biased simply check the contents of the synchronization word of the object and ensure that it is equal to the identifier of the current thread, masked with appropriate bits; no stores to the main memory are performed. On the other hand, if the lock is not biasable, an underlying synchronization technique that performs atomic operations is used to acquire the lock.

In one embodiment of the present invention, the underlying synchronization technique maintains records on the thread's stack each time a lock is acquired and released by that thread. These stack records allow the system to detect mismatched lock/unlock pairs, and also to record recursive entries of the same lock. For example, in FIG. 3C, object 304 is locked by an underlying synchronization technique by copying the contents of mark word 305 to a location in the stack 302 of the thread that holds the lock. At the same time, mark word 305 is replaced with a pointer 306 to the location (A) in the stack 302 containing the copied contents of mark word 305. Note that since the last two bits of every pointer are 00 in a 32-bit machine, the last two bits of the pointer 306 will be 00, which indicates that the object is locked (see FIG. 2).

In one embodiment of the present invention, while the object remains biased toward a given thread, the stack records are filled in lazily; this provides part of the efficiency of the present invention. Releases of the lock by the thread toward which it is biased simply check the presence of the bias bits in the synchronization word of the object. Invariants of block-structured locking and higher-level checks in the system ensure that a thread will only attempt to unlock a biased lock if it has actually acquired the lock, so the thread identifier itself need not be checked in the release path in order to report mismatched lock/unlock pairs.

Epochs

In one embodiment of the present invention, an object's locking information, in addition to recording the object's lock and bias state, lock/bias owner, and lock count (if necessary), can also record some number of bits specifying an "epoch," or timeframe, in which a bias is valid. In addition, each object also contains a specification of its class, for instance in the form of a pointer to class-specific information shared by all objects of a class. The following description explains a technique that unbiases objects of a given class.

Each class contains a field specifying the current epoch for that class. The basic invariant of the present invention is that objects whose lock state is biased and whose epoch matches the epoch of their class are considered biased (towards the bias owner of the object). If the epoch of a biasable object does not match that of its class, the object is considered to be in the unlocked, biasable state, in which all threads may compete to claim the bias using atomic operations. Threads can reclaim the bias of an object by inserting into the object the current epoch value of the object's class, so that the bias will be valid.

Figure 3B:
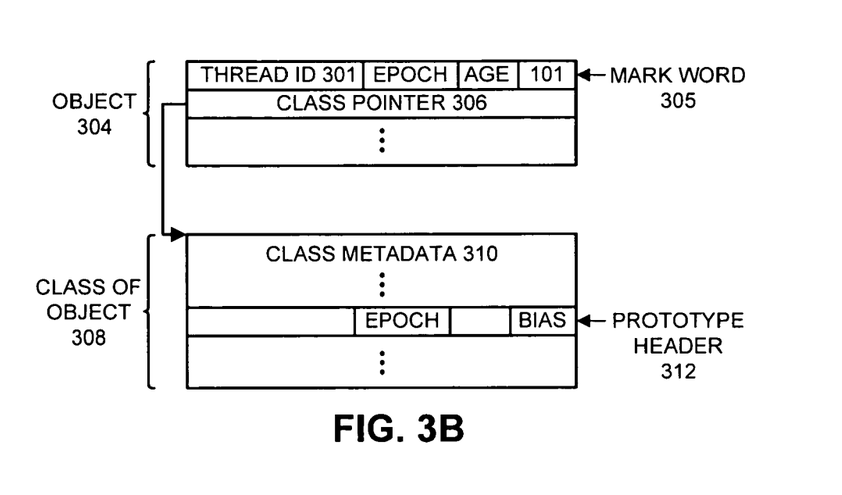
FIG. 3B illustrates the state of an object with an epoch field after the object has been biased by a given thread in accordance with an embodiment of the present invention.
Figure 3C:
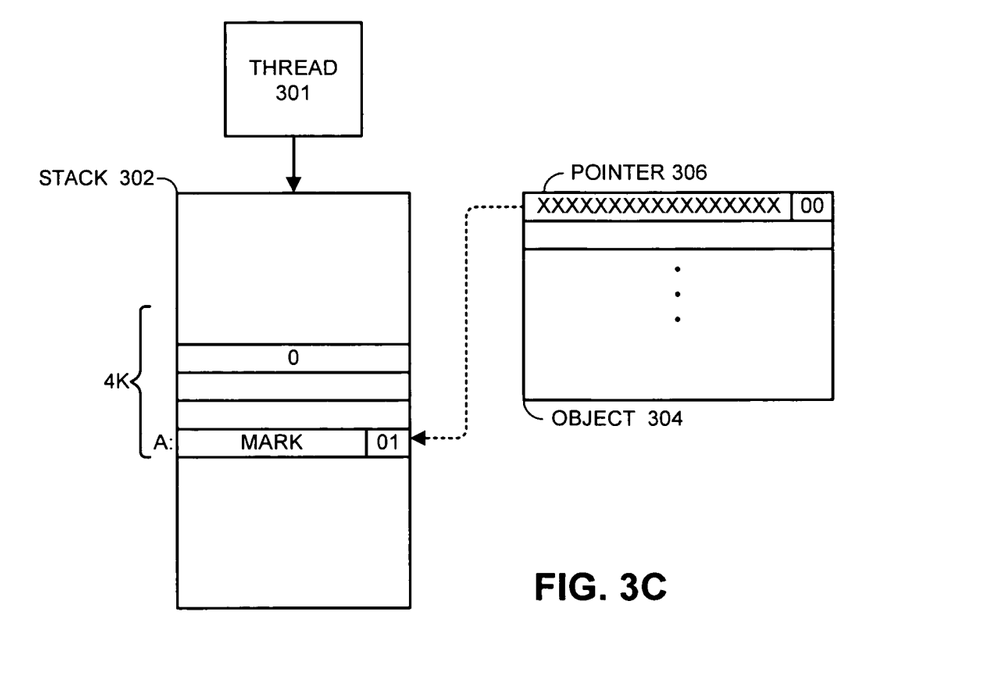
FIG. 3C illustrates a thread stack and an associated object after the object's bias has been revoked and an underlying synchronization technique is being used to describe the lock state of the object.

FIG. 3B illustrates an object 304 that contains in epoch in the mark word 305, as well as a class pointer 306 that points to class-specific information for the class of the object 308. This class header includes class metadata 310, such as a prototype header 312 that includes epoch and bias information for the class.

Details of Lock Acquisition

Figure 4:
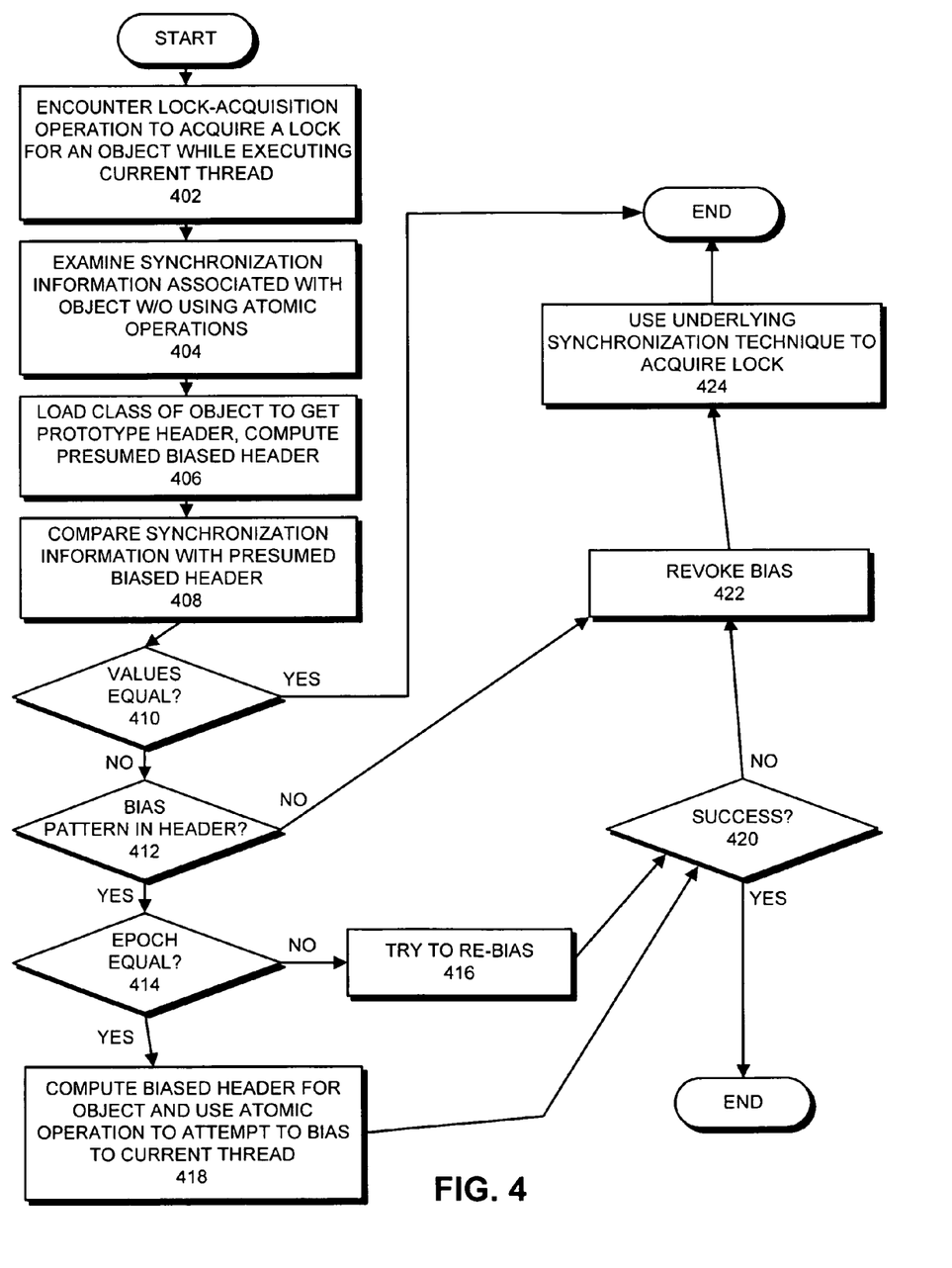
FIG. 4 presents a flow chart illustrating the process of acquiring a lock using epochs in accordance with an embodiment of the present invention.

Referring to FIG. 4, we now describe the process of acquiring a lock in more detail. First, the system encounters a lock-acquisition operation while executing a current thread (step 402). When a thread initiates a lock sequence on an object, it first examines the mark word of the object to see if the object is biasable, i.e., whether the bias pattern is present in the low order bits of the mark word 305. If the object is biasable, the thread tests whether the lock is currently biased toward itself, and, if so, whether the epoch of the bias is still valid.

The thread first loads and examines synchronization information (i.e. the mark word 305) associated with the object without using any atomic operations (step 404). It is important that the system preserve this value throughout the lock sequence without reload, in order to preserve correctness of the technique. The thread next loads the class of the object to get the prototype header 312 and constructs a "presumed biased header" (that presumes that the object is currently biased to the current thread) by logically "OR"ing the current thread's ID and the prototype header (step 406). The presumed biased header is then compared with the object's mark word 305, ignoring the age bits (step 408). If the two values are equal (step 410), the current thread still owns the bias of the object and the epoch of the object is current, and the lock sequence completes successfully.

If the two values are not equal, there are several possible reasons. For instance, the object may not have been biased yet, the epoch of a previous bias may have expired, biasing may have been disabled for the class type, or the object may currently be biased towards another thread. The system performs a sequence of tests to determine how to react most efficiently. First, the system checks the bias bits in the presumed biased header to ensure that the prototype header 312 indicates that the class is still biasable (step 412). If the class is no longer biasable, the system revokes the bias on the object (step 422).

In one embodiment of the present invention, the system revokes the bias of an object when it detects that the prototype header in the object's class no longer contains the bias pattern, thereby indicating that objects of the class may no longer be biased. The system first attempts to quickly revoke the bias of the object without reaching a full safe-point, by using an atomic compare-and-exchange operation. The system uses the original mark word 305 loaded from the object for the compare operation, and uses as an exchange value the prototype header of the class, which does not contain the bias pattern in the low bits. Note that it is important that the system does not re-load the mark word 305 from the object after the point at which it was determined that the class type is no longer biasable, because otherwise another thread's lock state may be incorrectly overwritten. This ensures that while multiple threads may attempt to modify the object's bias simultaneously, regardless of whether the compare-and-exchange operation succeeds, some thread in the system will successfully insert the unbiasable header into the object without destroying any other thread's result. After some thread succeeds in unbiasing the object, the object's header is then compatible with the underlying synchronization technique (step 424), and control falls through to that technique. Once that technique completes, the current lock sequence has succeeded.

If the system determines (in step 412) that biasing remains enabled for the data type, the system next determines whether the object's epoch has expired (step 414). The system compares the epoch value in the mark word 305 to the epoch in the class' prototype header 312. If the values are not equal, any previously-held bias of the object is invalid, and the object may legally be re-biased towards the current thread (step 416). The system attempts to re-bias the object to the current thread using an atomic compare-and-exchange operation. The comparison value is the original mark word 305, which, as with bias revocation, is not re-loaded to prevent correctness issues. The system computes the exchange value by "OR"ing the current thread ID with the high bits of the class's prototype header. If the atomic operation succeeds (step 420), the bias is now held by the current thread, and the lock sequence completes successfully. Otherwise, another thread may have succeeded in re-biasing the object towards itself, so the current thread revokes the bias on the object (step 422), and then proceeds using the underlying synchronization technique to acquire a lock for the object (step 424).

If the system finds the epochs to be equal (in step 414), the epoch of the current bias is still valid, but nothing is known about whether the bias owner is set or clear. The system attempts to acquire the bias of the object using an atomic compare-and-exchange operation that does not disturb the existing bias (step 418). The system compares the mark word 305 of the object with a copy of the presumed header in which the bits corresponding to the thread ID are explicitly set to zero (e.g. the bias owner is clear). Setting these bits to zero prevents the system from destroying any bias held by another thread. The value used for the exchange is the same value with the current thread ID installed in the high bits. If the atomic compare-and-exchange succeeds (step 420), the bias is now held by the current thread, and the lock sequence succeeds. If the atomic operation fails, the system knows that another thread has biased the object toward itself. In this case, the system revokes the object's bias (step 422), and then proceeds using the underlying synchronization technique to acquire a lock for the object (step 424).

In one embodiment of the present invention, the system maintains an invariant of only updating epochs when all program threads are quiescent and no program code is executing. Since the locking operation ensures that epochs for locked objects are current, this invariant guarantees that locked objects will always only contain either the current or previous epoch for an object.

Table 1 illustrates pseudocode for locking biasable objects with epochs.

TABLE 1

```
void lock(Object* obj, Thread* t) {
    int lw = obj->lock_word;
    if (lock_state(lw) == Biased
        && bias_epoch(lw) == obj->class->bias_epoch) {
        if (lock_or_bias_owner(lw) == t->id) {
            return; // Current thread is the bias owner.
        } else {
            // Need to unbias the object.
            initiate_unbiasing(obj, t);
        }
    } else {
        // normal locking/unlocking protocol, possibly with bias
        // acquisition of unlocked-biasable objects.
    }
}
```

Bulk Unbiasing

Figure 5:
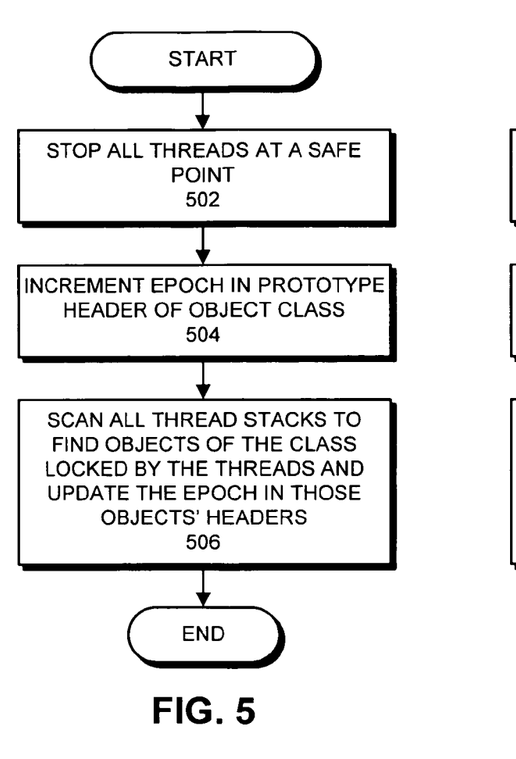
FIG. 5 presents a flow chart illustrating the process of a bulk-unbias operation in accordance with an embodiment of the present invention.

Using epochs makes bulk unbiasing of objects of class T much less costly. FIG. 5 presents a flow chart illustrating the process of a bulk-unbias operation. The system first stops all mutator threads at safe points (step 502), since without stopping the mutator threads it cannot tell reliably whether a biased object is currently locked or not. The thread performing the unbiasing then:

1. Increments the epoch number of class T (step 504). The epoch of T is a fixed-width integer, with the same bit-width in the class prototype header as in the object headers. As a result, while the increment operation may cause wrapping, this (as described below) does not compromise correctness.
2. Scans all thread stacks to locate objects of class T that are currently locked and biased, updating their bias epochs to the (new) current bias epoch for class T (step 506). Alternatively, based on heuristic considerations, the system can also change the treatment of currently-locked objects, for instance by converting them to an unbiasable locking state.

No heap scan is necessary; objects whose epoch numbers were not changed will (for the most part) now have a different epoch number than their class, and will be considered to be in the unlocked, biasable state.

Incrementing a class's bias epoch will only "for the most part" unbias all objects of the given class. This qualification is important because of the finite width of the epoch field, which allows integer "wrapping." If the epoch field is N bits wide, and X is an object of class T, then if $2^N$ bulk unbiasing operations for class T occur without any operation updating the bias epoch of X to the current epoch, then it will appear that X is again biased in the current epoch, and that its bias is valid. Note that this is purely a performance concern; it is perfectly permissible, from a correctness viewpoint, to consider X biased. Since bias is primarily a "hint," it indicates that if a thread other than the bias holder attempts to lock X, an individual object unbiasing operation may be required.

A sufficiently large value of N can decrease the frequency of wrapping significantly. Furthermore, since objects that are actually locked between one epoch and the next have their epoch updated to the current epoch, the wrapping situation only occurs with infrequently-locked objects.

In one embodiment of the invention, the system arranges for operations that naturally visit all live objects, e.g. garbage collection, to "normalize" lock states by converting biased objects with invalid epochs into unlocked-biasable objects. In a system with "stop-world collection," this operation can use non-atomic stores. In a concurrent marker collection, however, the system needs to update lock words with an atomic operation, since the marking thread might potentially compete with mutator threads to modify the lock word. One option is to have the system choose N large enough to make it highly likely that a full-heap garbage-collection occurs before $2^N$ bulk-unbias operations for a given type, thereby preventing wrapping issues.

Revoking Bias for a Class and Bias Granularity

Sometimes biased locking is inappropriate for a given object or class. For example, in a system containing a queue with a number of producer and consumer threads, an object may seldom be locked by the same thread even twice consecutively. In general, if the system detects that that unbias operations occur too frequently for a given object or class, it may convert the object, or all objects of the class, to the unbiasable state. For individual objects, this is a small variation on the existing scheme. The contending thread halts the bias owner at a safe point, the system scans the thread stack to determine whether it is currently locking the object in question, and then the system converts the object's state to unbiasable (either locking the object or not, depending on the result of the stack scan).

Figure 6:
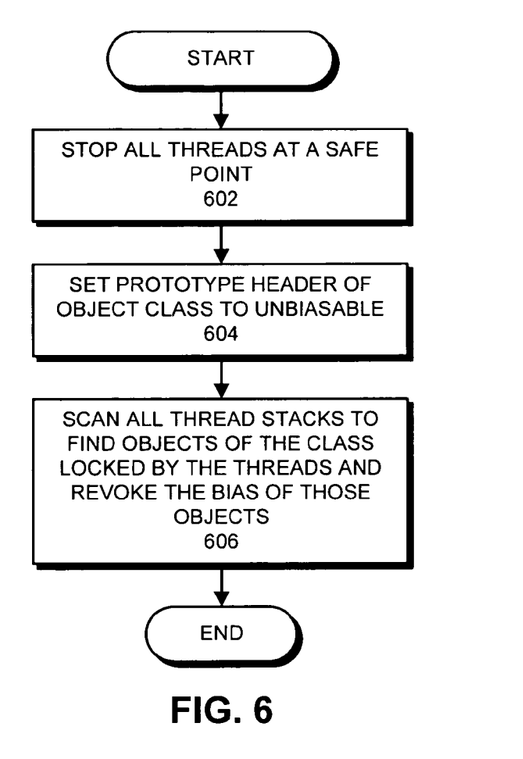
FIG. 6 presents a flow chart illustrating the process of bulk revocation in accordance with an embodiment of the present invention.

Converting an entire class to be unbiasable is substantially similar to a bulk unbias operation, and is presented in FIG. 6. After stopping all threads at a safe point (step 602), the system sets the prototype header of the specified object class to unbiasable (step 604). The system then proceeds to scan all thread stacks to find the objects of the class type and revoke their bias (step 606).

In one embodiment of the present invention, instead of performing the initial test in the lock operation (presented in Table 2), the system uses a "biasable bit" present in each class and object lock word (presented in Table 3). In another embodiment of the present invention, the biasable bit and the bias epoch field are consecutive in both the object lock word and in the class, to effectively form an epoch field with a size of N+1 bits. Note that in this embodiment, incrementing the epoch still wraps within N bits; overflow does not make a class unbiasable. With this data layout, the lock test reverts to the original form presented in Table 4.

TABLE 2

```
void lock(Object* obj, Thread* t) {
    int lw = obj->lock_word;
    if (lock_state(lw) == Biased
        && bias_epoch(lw) == obj->class->bias_epoch) {
```

TABLE 3

```
void lock(Object* obj, Thread* t) {
    int lw = obj->lock_word;
    if (lock_state(lw) == Biased
        && biasable(lw) == obj->class->biasable
        && bias_epoch(lw) == obj->class->bias_epoch) {
```

TABLE 4

```
void lock(Object* obj, Thread* t) {
    int lw = obj->lock_word;
    if (lock_state(lw) == Biased
        && biasable_then_bias_epoch(lw) ==
            obj->class->biasable_then_bias_epoch) {
```

In one embodiment of the present invention, the system uses a single bias epoch for all classes that allows all objects to be unbiased in a short operation. This embodiment results in the system only having to perform a single stack scan, and serves as an alternative to the system iterating over all classes to increment their individual epochs. However, this is unlikely to be the appropriate granularity; if unbiasing of all objects is desired, it is likely to be reasonable to iterate over all classes to increment their individual epochs.

In one embodiment of the present invention the system may need to unbias at granularities between individual objects and all objects of a given class. For example, the system might distinguish between objects of a given class based on their allocation site by modifying allocation code to insert an allocation site identifier in the object header. In this example, each allocation site has its own epoch, and the system checks the appropriate epoch for the object during the locking sequence (as shown in Table 5).

TABLE 5

```
void lock(Object* obj, Thread* t) {
    int lw = obj->lock_word;
    if (lock_state(lw) == Biased
        && bias_epoch(lw) ==
            obj->class->bias_epoch[obj->alloc_site_id]) {
```

In summary, the system described in the present invention allows the system to revoke (almost) all biased locks with an operation proportional only to stack height, rather than the size of the heap. This improvement offers substantial performance improvements for the bulk revocation of biased locks by avoiding atomic operations for lock and unlock sequences while allowing bulk transfer of ownership of biases of objects between threads in a scalable manner.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for facilitating bulk lock-unbiasing for objects within an object-based computing system, comprising:
   maintaining an epoch for a biasable object class and each instance of the biasable object class, wherein the epoch is a field containing a timestamp;
   wherein if the epoch for the biasable object class matches the epoch for a specific instance of the biasable object class, any bias for the specific instance is currently valid;
   receiving a signal to perform a bulk lock-unbiasing operation for instances of the biasable object class;
      in response to the signal, stopping all threads in the object-based computing system at a safe point, and
      performing a bulk lock-unbiasing operation for unlocked instances of the biasable object class by incrementing the epoch for the biasable object class and by incrementing corresponding epochs for locked instances of the biasable object class; and
   upon encountering a lock-acquisition operation while executing a current thread, wherein the lock-acquisition operation attempts to acquire a lock for the specific instance,
      examining synchronization information associated with the specific instance, wherein the process of examining the synchronization information does not involve atomic operations, and
if the synchronization information indicates that the lock is biasable, the lock is biased toward the current thread, and the epoch of the specific instance matches the epoch of the biasable object class, allowing the current thread to acquire the lock without updating the synchronization information.

2. The method of claim 1, wherein incrementing the epoch for locked instances involves:
   searching the stack of the thread to identify instances of the biasable object class which are locked by the thread; and
   updating the epochs for the identified locked instances by incrementing the epoch values associated with the instances.

3. The method of claim 1, wherein maintaining the epoch for the biasable object class involves storing the epoch in a prototype header located in the metadata of the biasable object class.

4. The method of claim 1, wherein if the synchronization information indicates that the lock is biasable and the lock is presently unbiased, or that the lock is biasable but the epoch of the specific instance does not match the epoch of the biasable object class, the method further comprises:
   using an atomic operation to attempt to update the synchronization information to indicate that the lock is biased toward the current thread in the current epoch of the biasable object class; and
   if the atomic operation succeeds, allowing the current thread to acquire the lock.

5. The method of claim 4, wherein if the synchronization information indicates that the lock is biasable, the lock is biased towards another thread, and the epoch of the specific instance matches the epoch of the biasable object class, the method further comprises revoking the bias of the lock.

6. The method of claim 5, wherein if the atomic operation fails, the bias of the lock is revoked, or the synchronization information indicates that the lock is not biasable, the method further comprises using an underlying synchronization technique to acquire the lock.

7. The method of claim 4, wherein the prototype header is used to construct a value to be compared with synchronization information associated with the specified instance using a single XOR operation.

8. The method of claim 7, wherein the synchronization information associated with the object is contained within a synchronization word within the object.

9. The method of claim 1, wherein the method further comprises:
   estimating a rate of bias revocation on a per-object-class basis; and
   if the estimated rate of bias revocation for a given object class exceeds a threshold value, performing either a bulk unbias or a bulk revocation for all instances of the given object class.

10. A computer-readable storage medium storing instructions that when executed by a computer cause the computer to perform a method for facilitating bulk lock-unbiasing for objects within an object-based computing system, comprising:
   maintaining an epoch for a biasable object class and each instance of the biasable object class, wherein the epoch is a field containing a timestamp;
   wherein if the epoch for the biasable object class matches the epoch for a specific instance of the biasable object class, any bias for the specific instance is currently valid;
   receiving a signal to perform a bulk lock-unbiasing operation for instances of the biasable object class;
      in response to the signal, stopping all threads in the object-based computing system at a safe point, and
      performing a bulk lock-unbiasing operation for unlocked instances of the biasable object class by incrementing the epoch for the biasable object class and by incrementing corresponding epochs for locked instances of the biasable object class; and
   upon encountering a lock-acquisition operation while executing a current thread, wherein the lock-acquisition operation attempts to acquire a lock for the specific instance,
      examining synchronization information associated with the specific instance, wherein the process of examining the synchronization information does not involve atomic operations, and
      if the synchronization information indicates that the lock is biasable, the lock is biased toward the current thread, and the epoch of the specific instance matches the epoch of the biasable object class, allowing the current thread to acquire the lock without updating the synchronization information.

11. The computer-readable storage medium of claim 10, wherein incrementing the epoch for locked instances involves:
  searching the stack of the thread to identify instances of the biasable object class which are locked by the thread; and
  updating the epochs for the identified locked instances by incrementing the epoch values associated with the instances.

12. The computer-readable storage medium of claim 10, wherein maintaining the epoch for the biasable object class involves storing the epoch in a prototype header located in the metadata of the biasable object class.

13. The computer-readable storage medium of claim 10, wherein if the synchronization information indicates that the lock is biasable and the lock is presently unbiased, or that the lock is biasable but the epoch of the specific instance does not match the epoch of the biasable object class, the method further comprises:
  using an atomic operation to attempt to update the synchronization information to indicate that the lock is biased toward the current thread in the current epoch of the biasable object class; and
  if the atomic operation succeeds, allowing the current thread to acquire the lock.

14. The computer-readable storage medium of claim 13, wherein if the synchronization information indicates that the lock is biasable, the lock is biased towards another thread, and the epoch of the specific instance matches the epoch of the biasable object class, the method further comprises revoking the bias of the lock.

15. The computer-readable storage medium of claim 14, wherein if the atomic operation fails, the bias of the lock is revoked, or the synchronization information indicates that the lock is not biasable, the method further comprises using an underlying synchronization technique to acquire the lock.

16. The computer-readable storage medium of claim 13, wherein the prototype header is used to construct a value to be compared with synchronization information associated with the specified instance using a single XOR operation.

17. The computer-readable storage medium of claim 16, wherein the synchronization information associated with the object is contained within a synchronization word within the object.

18. The computer-readable storage medium of claim 10, wherein the method further comprises:
  estimating a rate of bias revocation on a per-object-class basis; and
  if the estimated rate of bias revocation for a given object class exceeds a threshold value, performing either a bulk unbias or a bulk revocation for all instances of the given object class.

19. An apparatus for facilitating bulk lock-unbiasing for objects within an object-based computing system, comprising:
  at least one processor;
  a maintenance mechanism configured to maintain an epoch for a biasable object class and each instance of the biasable object class, wherein the epoch is a field containing a timestamp;
  wherein if the epoch for the biasable object class matches the epoch for a specific instance of the biasable object class, any bias for the specific instance is currently valid;
  a receiving mechanism configured to receive a signal to perform a bulk lock-unbiasing operation for instances of the biasable object class;
  a stop mechanism configured to, in response to the signal, stop all threads in the object-based computing system at a safe point; and
  an incrementing mechanism configured to perform a bulk lock-unbiasing operation for unlocked instances of the biasable object class by incrementing the epoch for the biasable object class and by incrementing corresponding epochs for locked instances of the biasable object class; and
  a lock-acquisition mechanism, wherein upon encountering a lock-acquisition operation while executing a current thread, the lock-acquisition mechanism is configured to attempt to acquire a lock for the specific instance by,
    examining synchronization information associated with the specific instance, wherein the process of examining the synchronization information does not involve atomic operations, and
    if the synchronization information indicates that the lock is biasable, the lock is biased toward the current thread, and the epoch of the specific instance matches the epoch of the biasable object class, allowing the current thread to acquire the lock without updating the synchronization information.

20. The apparatus of claim 19, wherein the incrementing mechanism that increments the epoch for locked instances further comprises:
  a search mechanism that searches the stack of the thread to identify instances of the biasable object class which are locked by the thread; and
  an update mechanism that updates the epochs for the identified locked instances by incrementing the epoch values associated with the instances.

* * * * *